INVENTOR:
CHRISTIAN GREUNE

ATTORNEYS

United States Patent Office 3,623,326
Patented Nov. 30, 1971

3,623,326
INSTALLATION FOR THE CONTROL OF A GAS TURBINE ENGINE
Christian Greune, Schongeising, Germany, assignor to Motoren- und Turbinen-Union, Munchen G.m.b.H., Munich, Germany
Filed Dec. 3, 1969, Ser. No. 881,829
Claims priority, application Germany, Dec. 21, 1968,
P 18 16 414.2
Int. Cl. F02c 3/10
U.S. Cl. 60—39.16
18 Claims

ABSTRACT OF THE DISCLOSURE

An installation for controlling a gas turbine drive unit, especially for vehicles, in which the guide vanes at the inlet of the output turbine are adjusted as a function of the deviation of the hot gas temperature, downstream of the combustion chamber, from a predetermined rated value.

---

The invention relates to an installation for the control of a gas turbine drive unit, especially for vehicles, which includes a free-power turbine with adjustable inlet guide vanes and a fuel control/governor and which is equipped with, or without, a heat exchanger.

In the case of gas turbine engines, especially for vehicles, attempts are made to achieve favorable acceleration characteristics, on the one hand, and a favorable fuel consumption during off-design performance under partial load operation, on the other hand.

With gas turbine drive units that do not feature variable guide vanes upstream of the free-power turbine, the maximum permissible gas temperature is reached at about one hundred percent of the gas turbine engine speed. Below one hundred percent speed of the gas turbine engine, the gas temperature will first drop, and the efficiency of the installation will become worse.

For the improvement of the efficiency of gas turbine engines, it has already been proposed to increase the gas temperature during off-design performance, and more particularly by means of an adjustment of the inlet guide vanes upstream of the free-power turbine. In this manner, the temperature of the gases upon entering the compressor turbine is maintained approximately constant, if—as has been known already—the inlet guide vanes are, for instance, varied as a function of the speed of the gas generator.

With these known measures, that have already been suggested for use on gas turbine engines, the requirements for improvement of the efficiency during off-design performance will at least be met approximately.

However, to achieve favorable acceleration characteristics, the speed of the gas turbine engine will be required to be increased as rapidly as possible, without a substantial decrease in the performance or output of the free-power turbine. This is essentially accomplished only by maintaining an air mass flow and a gas temperature as high as possible. During a transition phase from a steady-state to an acceleration condition, the fuel will be increased temporarily and the inlet guide vanes of the free-power turbine opened up, in order to avoid excess temperatures. When the new steady-state condition is reached, the fuel flow will be reduced and the inlet guide vanes closed. During the whole cycle, the gas temperature should be near the maximum temperature limit, in order to achieve an optimum acceleration behavior.

Within the scope of the problem described, the main task to be solved by the present invention is thus to provide an installation that will solve the problem of maintaining a constant, high gas temperature both during steady-state and acceleration performance in a relatively simple manner, whereby an excess temperature temporarily occuring during, for instance, an acceleration operation of the engine, and a sudden increase in the gas temperature associated with this operation, are to be avoided by means of this installation, in particular.

For the solution of the given problem, the present invention proposes the use of a mechanism of the above-mentioned type mainly consisting of a temperature controller that measures the hot gas temperature downstream of the combustion chamber and controls the inlet guide vane adjustment as a function of the deviation of the hot gas temperature from a predetermined nominal value, in order to match the hot gas temperature to the predetermined nominal value.

In a further, suitable embodiment of the present invention, this temperature controller has the task of reducing the pressure prevailing in a bleed line supplied with compressor air and thus of simultaneously reducing the pressure within a pneumatically operated actuator, which will then further open up the inlet guide vanes of the free-power turbine, when the predetermined hot gas temperature is exceeded.

This invention, furthermore, provides for the temperature controller to be actuated as a function of the throttle lever or gas pedal position.

In accordance with a further feature of this invention, the pneumatically operated actuator can consist of a generally known piston moving in a cylinder in an axial direction and being spring-loaded at its one end and subjected to the pressure prevailing in the bleed line at its other end, whereby the piston rod is connected with the inlet guide vane actuating mechanism of the free-power turbine.

In a further embodiment of the present invention, it will be possible to provide for an acceleration valve connected to the throttle linkage and bleed line, in order to effect a decrease in the pressure prevailing in the bleed line, when the throttle lever or gas pedal is moved suddenly.

It is the task of this acceleration valve to override the temperature controller and to vary the inlet guide vanes of the free-power turbine temporarily, when a set actuating speed of the throttle lever and thus the speed and fuel flow of the gas turbine engine are exceeded, in order to prevent temporarily excess temperatures from occurring when the gas temperature is increased suddenly. The acceleration valve thus assists the temperature controller, if the latter does not respond sufficiently fast to a sudden increase in the gas temperature. It is intended that the effect of the acceleration valve be diminished again after a short period so that the actuation of the inlet guide vanes of the free-power turbine is again subject to the temperature controller.

According to the present invention, it will further be possible for the acceleration valve to be operated hydraulically, and more particularly, by means of a first piston connected to the throttle linkage by way of a lever and moving against the action of a return spring, whereby a second, spring-loaded piston will open a bleed orifice connected with the bleed line.

In a special type of construction of the invention, the temperature controller can consist of a temperature-operated expansion element (sleeve, pin) arranged in the hot gas stream of the compressor-driving turbine, in which this pin will actuate a spring-loaded lever when the hot gas temperature exceeds a predetermined nominal value, whereby this lever will open a bleed orifice connected to the bleed line, and whereby this lever is additionally eccentrically supported at a datum actuating lever operated by the throttle linkage.

These and other objects, features, and advantages of the present invention will become more obvious from the following description when taken in connection with the accompanying drawing, which shows, for purposes of illustration only, several embodiments in accordance with the present invention, and wherein.

Figure 1:
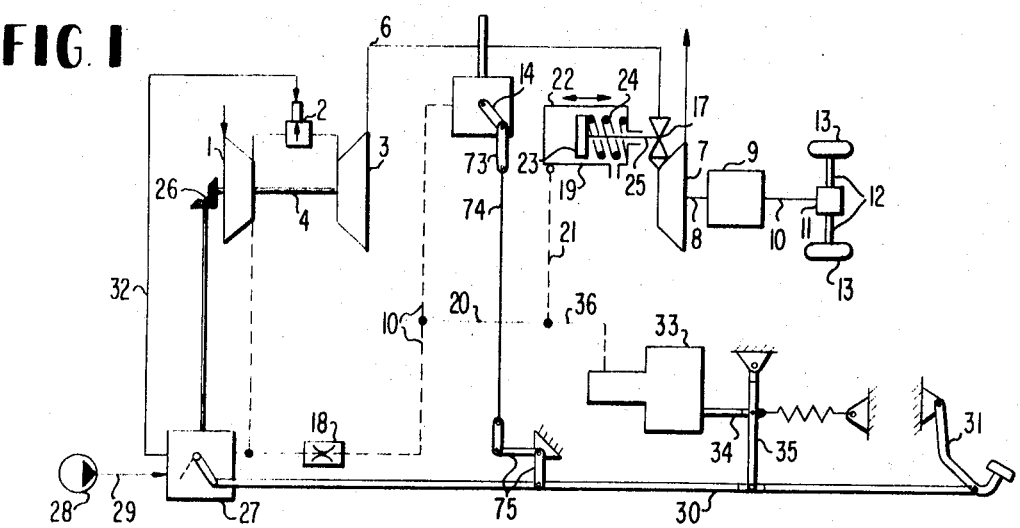
FIG. 1 is a schematic view of a first embodiment of a control system according to the invention, including a gas turbine engine.

Referring now to the drawing wherein like reference numerals are used throughout the various views to designate like parts, and more particularly to FIG. 1, this figure illustrates a generally known gas turbine engine in schematic representation, consisting of a compressor 1, a combustion chamber 2 downstream of the compressor, and a compressor-driving turbine 3 downstream of the combustion chamber, this turbine 3 being connected to the compressor 1 by way of a shaft 4. The gases delivered by the compressor-driving turbine 3 flow to a free-power turbine 7 by way of a gas duct 6. The power of the free-power turbine 7 is transmitted to a conventional change-speed transmission 9, shown schematically, by way of a shaft 8. The output of the gas turbine engine is transmitted to the drive axles 12 and thus to the wheels 13 of a vehicle by way of a shaft 10' of the change-speed transmission 9 and by way of a differential 11.

As can further be seen from FIG. 1, a temperature controller 14, to be explained in detail hereinafter by reference to FIG. 5, protrudes into the gas duct 6 with its sleeve 15 incorporating a pin 16 (as a temperature sensor).

This temperature controller 14 is designed to effect an adjustment of the inlet guide vanes 17 arranged in the gas duct 6 upstream of the free-power turbine 7, when the hot gas temperature in duct 6 deviates from the nominal value. On its one side, the temperature controller 14 is subjected to the delivery pressure of the compressor 1 by way of a bleed line 10, where a pilot restrictor or pre-throttling device 18 is arranged in the bleed line. When the hot gas temperature exceeds a predetermined nominal value, the temperature controller 14 will thus cause a reduction of the air pressure prevailing in the bleed line 10. Simultaneously, a pressure drop in an air-operated actuator 19 is effected in that this actuator 19 is connected to the bleed line 10 by way of lines 20, 21. This air-operated actuator 19 basically consists of a piston 23 moving within a cylinder 22 in an axial direction, whereby this piston 23 is spring-loaded, on its one side, and subjected to the pressure prevailing in the bleed line 10 by way of lines 20, 21, on its side opposite spring 24. A piston rod 25 of the air-operated actuator 19 is connected with the actuating mechanism of the inlet guide vanes 17. The temperature controller 14 thus effects a pressure drop in the bleed line 10, as soon as the hot gas temperature deviates from a predetermined nominal value, whereupon the piston 23 of the actuator 19 will be displaced, due to the action of the spring 24 and owing to the connection existing between the bleed line 10 and the air-operated actuator 19 by way of lines 20, 21, so that the guide vanes 17 are adjusted by way of the piston rod 25.

Furthermore, FIG. 1 shows a fuel-control/governor 27 driven by the bevel gear transmission 26 and generally known as far as its design and application in gas turbine engines are concerned, so that a further explanation thereof can be dispensed with. This fuel-control/governor 27 is supplied with fuel from the tank pump 28 by way of line 29. As can further be seen from FIG. 1, this fuel-control/governor 27 is connected with the throttle linkage 30 of the vehicle, which varies the datum of the governor. The throttle lever attached to this linkage 30 is designated by reference numeral 31. The fuel is thus supplied to the combustion chamber 2 by way of a fuel line 32 arranged between the fuel-control/governor 27 and the combustion chamber 2, whereby the fuel metering will be effected by this fuel-control/governor 27, inter alia, as a function of the speed of the gas turbine engine and of the throttle lever position as well as of the supply pressure of the tank pump 28.

In the event that the temperature controller or its sensor (pin 16 and sleeve 15) will not respond fast enough to a temperature change caused by a sudden change or alteration of the load, an acceleration valve 33 has been provided for this purpose. On its one side, this acceleration valve 33 is connected to the throttle linkage 30 by way of a lever 35, and on its other side, to the bleed line 10 by way of the lines 36 and 20, respectively, in order to—as already mentioned above—reduce the air pressure in the bleed line 10 in addition to the control function of the temperature controller 14, when the gas supply sets-in suddenly.

Figure 2:
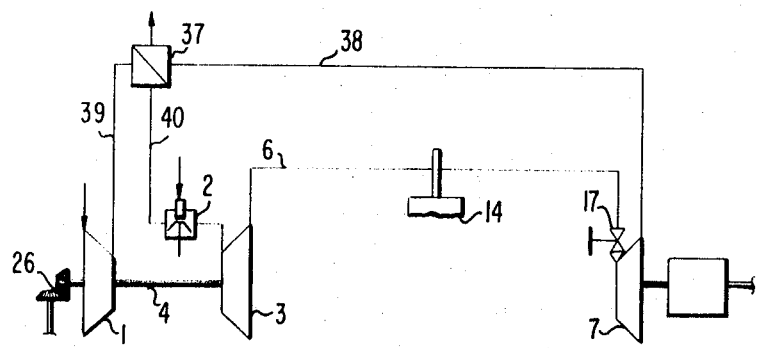
FIG. 2 is a partial schematic view of a modified embodiment of a control system and illustrating part of the control system illustrated in FIG. 1, as a modification thereof by the integration of a heat exchanger in the thermo-dynamic cycle of the gas turbine engine.

FIG. 2 illustrates a further modification of the type of construction shown in FIG. 1 in that a heat-exchanger 37 is incorporated in the thermodynamic cycle of the gas turbine engine 1, 2, 3, 4, 7 On the one hand, this heat-exchanger 37 is subject to the gases discharged from the free-power turbine 7, by way of a line 38, and on the other hand, it is subject to the air delivered by compressor 1, by way of a line 39. In this manner, the compressor air is heated up by the gases discharged from the free-power turbine 7 and enters the combustion chamber 2 in a preheated condition, by way of line 40. As already mentioned above, a heat-exchanger of this type represents, inter alia, a known means for reducing the relatively high fuel consumption rates occurring with gas turbine engines used for driving vehicles. On the other hand, the control system shown in FIG. 1 is designed to be applicable to the type of embodiment according to FIG. 2, so that it will be possible to use the major shifting and control elements on the basis of FIG. 1, as already explained in detail.

Figure 3:
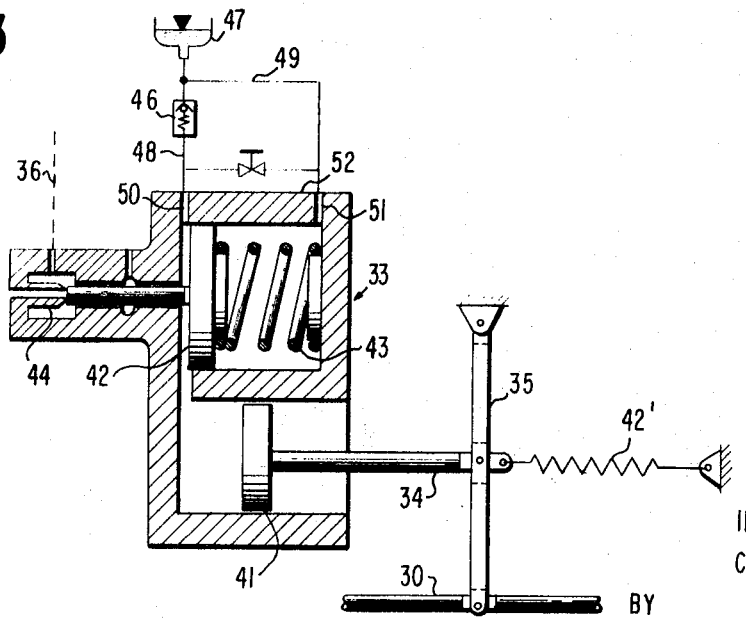
FIG. 3 is a cross-sectional side view of an acceleration valve shown on an enlarged scale and in more detail than in FIG. 1.

FIG. 3 is a more detailed illustration of the acceleration valve 33 shown only schematically in FIG. 1.

On its one side, this acceleration valve according to FIG. 3 is operated by the throttle linkage 30 by way of the lever 35, connected to the piston rod 34 associated with piston 41, in which, furthermore, a return-spring 42' is provided at the rear end of the piston rod 34. The acceleration valve 33 is operated hydraulically. By movement of the piston 41, by way of the throttle linkage 30, in the direction of arrow 30' (acceleration), a further piston 42 will open a bleed orifice 44 against the action of an actuating spring 43, whereby this orifice 44 connects with the bleed line 10, by way of a line 36. When the bleed orifice 44 opens, the pressure in the bleed line 10 is reduced, thus causing the guide vanes 17 to be adjusted as required, since the line 36 leading to the acceleration valve 33 connects with the air-operated actuator 19 by way of the line 21, as can be seen from FIG. 1. In the acceleration valve 33 according to FIG. 3, the timing element is formed by the area of piston 42, the force of the spring 43 and on the basis of the cross-sectional area of the adjustable restrictor or throttling device 44. During movement of the throttle linkage 30 in the direction of arrow 45 (deceleration), the timing element is by-passed by a spring-loaded non-return valve 46. A reservoir 47, shown in FIG. 3, supplies hydraulic fluid to the acceleration valve 33, by way of the lines 48, 49 and of the feed and drain holes 50, 51 that are associated with these lines and are located in the housing 52 of the acceleration valve.

Figure 4:
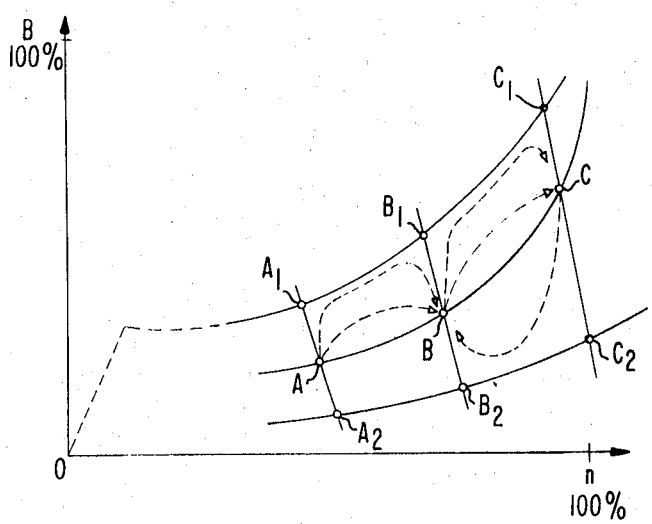
FIG. 4 is a fuel/speed diagram.

FIG. 4 illustrates the acceleration cycle by means of a fuel/speed diagram. The fuel quantity B is plotted on the vertical ordinate up to 100 percent, while the speed $n$ is plotted on the horizontal ordinate also up to 100 percent. The line connecting the points A, B, C represents the steady-state operating line, while the maximum and minimum fuel lines $A_1$, $B_1$, $C_1$ and $A_2$, $B_2$, $C_2$ are obtained during acceleration and deceleration, respectively. Upon very slow movement of the throttle lever during acceleration, the line A, B, C is obtained. With increasing speed of the throttle lever movement, the line slope $A_1$, $B_1$, $C_1$ or $A_2$, $B_2$, $C_2$ is reached. The lines $A_1/A_2$, $B_1/B_2$, $C_1/C_2$ are characteristics of the governor.

Figure 5:
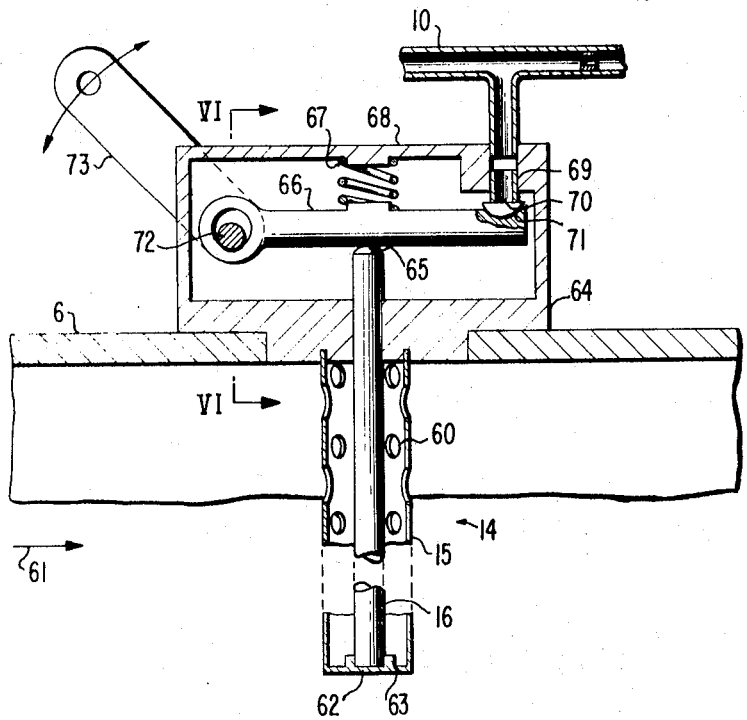
FIG. 5 is a cross-sectional side view of an embodiment of a temperature controller, shown on an enlarged scale and in more detail than in FIG. 1.
Figure 6:
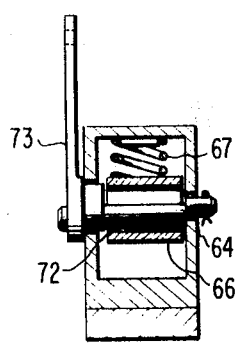
FIG. 6 is a cross-sectional view taken along line VI—VI of FIG. 5.

Finally, FIGS. 5 and 6 illustrate further details of the temperature controller 14 shown only schematically in FIG. 1.

As can be seen from FIG. 5, the temperature controller protrudes into the gas duct 6, shown only partially, with its expansion elements (sleeve 15 with holes 60) and with the pin 16 that is located in this sleeve and is movable in a transverse direction to the gas tream 61. The pin 16 is fixed at the bottom 62 of the sleeve 15 by means of a collar 63. On top, the pin 16 protrudes through the housing 64 of the temperature controller 14, which is directly mounted on the top of the gas duct 6, whereby this pin actuates a lever 66 with a radiused upper edge 65, this lever 66 being loaded by a spring 67; this spring 67 is retained by a collar 68 of the housing 64. When the hot gas temperature exceeds a predetermined nominal value, this lever 66 thus opens a bleed orifice 69, connected with the bleed line 10, in such a manner that the lever 66 causes a baffle plate 70 to be lifted from the orifice 69 due to the changed temperature and the position of the pin 16, changed as a result of the above, whereby this baffle plate 70 is retained in a recess 71 associated with the lever 66. On the side opposite the bleed orifice 69, the lever 66 (FIG. 6) is eccentrically mounted to a bolt 72, whereby this bolt 72, in turn, connects with a lever 73 supported in the housing 64; this lever 73 is actuated, as a so-called "datum actuating lever," by the throttle linkage 30 (FIG. 1) and by way of further lever linkages 74, 75, and it can effect a positional change of the lever 66.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are known to those skilled in the art.

I claim:

1. An installation for the control of a gas turbine engine, which includes a combustion chamber, a compressor and a free-power turbine with adjustable inlet guide vane means and fuel-control/governor means, a temperature control means is provided, which measures hot gas temperature downstream of the combustion chamber said temperature control means effects a variation of the inlet guide vane means as a function of the hot gas temperature deviating from a predetermined rated value, in order to match the hot gas temperature to the predetermined value.

2. An installation according to claim 1, characterized in that the temperature control means is operable to reduce the pressure prevailing in a bleed line, subject to air delivered by the compressor, and thus effects a pressure drop within a pneumatically operated actuator means operatively connected with said bleed line and operable to further open the inlet guide vane means, when the predetermined hot gas temperature is exceeded.

3. An installation according to claim 2, with a gas pedal, characterized in that the temperature control means is adjustable as a function of the gas pedal position.

4. An installation according to claim 3, characterized in that the pneumatically operated actuator means includes a piston adapted to be displaced in an axial direction inside a cylinder, said piston being spring-loaded, on its one side, and subjected to the pressure prevailing in the bleed line, on its other side, and the piston rod of said piston being operatively connected with a guide vane actuating mechanism for adjusting said guide vane means.

5. An installation according to claim 4, characterized by acceleration valve means operatively connected with a gas pedal linkage means and the bleed line to reduce the pressure in the bleed line, when the gas pedal is moved suddenly.

6. An installation according to claim 5, characterized in that the acceleration valve means is actuated hydraulically by means of a first piston whose piston rod is operatively connected with the gas pedal linkage means by way of lever means, and is displaceable against the action of a return spring, which causes a second, spring-loaded piston to open a bleed orifice operatively connected with the bleed line.

7. An installation according to claim 3, characterized in that the temperature control means consists of a the temperature of turkey carcass to about 70°–80° F. pin and sleeve arranged in the hot gas stream of the compressor-driving turbine, whereby the pin actuates a spring-loaded lever, when the hot gas temperature exceeds a predetermined nominal value, and in which said lever opens a bleed orifice operatively connected with the bleed line and in which said lever is eccentrically mounted to a datum actuating lever operated by the gas pedal linkage means.

8. An installation according to claim 6, characterized in that the free-power turbine drives the wheels of a motor vehicle by way of a change-speed gear.

9. An installation according to claim 1, with a gas pedal, characterized in that the temperature control means is adjustable as a function of the gas pedal position.

10. An installation according to claim 2, characterized in that the pneumatically operated actuator means includes a piston adapted to be displaced in an axial direction inside a cylinder, said piston being spring-loaded, on its one side, and subjected to the pressure prevailing in the bleed line, on its other side, and the piston rod of said piston being operatively connected with a guide vane actuating mechanism for adjusting said guide vane means.

11. An installation according to claim 3, characterized by acceleration valve means operatively connected with a gas pedal linkage means and the bleed line to reduce the pressure in the bleed line, when the gas pedal is moved suddenly.

12. An installation according to claim 11, characterized in that the acceleration valve means is actuated hydraulically by means of a first piston whose piston rod is operatively connected with the gas pedal linkage means by way of lever means, and is displaceable against the action of a return spring, which causes a second, spring-loaded piston to open a bleed orifice operatively connected with the bleed line.

13. An installation according to claim 2, characterized in that the temperature control means consists of a temperature-controlled expansion element including a pin and sleeve arranged in the hot gas stream of the compressor-driving turbine, whereby the pin actuates a spring-loaded lever, when the hot gas temperature exceeds a predetermined nominal value, and in which said lever opens a bleed orifice operatively connected with the bleed line and in which said lever is eccentrically mounted to a datum actuating lever operated by a gas pedal linkage means.

14. An installation according to claim 6, characterized by heat-exchanger means for preheating the air fed to the combustion chamber by the exhaust gases of the free-power turbine.

15. An installation according to claim 2, characterized by acceleration valve means operatively connected with a gas pedal linkage means and the bleed line such as to reduce the pressure in the bleed line when the gas pedal is moved suddenly.

16. An installation according to claim 1, characterized by acceleration valve means operatively connected with a gas pedal linkage means to additionally adjust the variation in the guide vane means.

17. An installation for the control of a gas turbine engine having a combustion chamber, a compressor, and a free power turbine with adjustable inlet guide vane means, said control installation comprising a bleed line subject to air delivered by the compressor, an acceleration valve means operatively connected with a gas pedal linkage means and the bleed line so as to regulate the pressure in the bleed line in response to sudden movements of the gas pedal, and a pneumatically operated actuator means operable to vary the adjustment of the inlet guide vane means in response to pressure changes in the bleed line.

18. An installation according to claim 17, characterized in that the control installation further comprises temperature control means which measures the hot gas temperature downstream of the combustion chamber and effects an adjustment of the inlet guide vane means as a function of said hot gas temperature.

References Cited
UNITED STATES PATENTS

| | | | |
|---|---|---|---|
| 3,168,810 | 2/1965 | Gatzemeyer | 60—39.16 |
| 3,181,295 | 5/1965 | Pauwels | 60—39.16 |
| 3,196,611 | 7/1965 | Henny | 60—39.16 |
| 3,240,013 | 3/1966 | Spath | 60—39.16 X |
| 3,243,596 | 3/1966 | Loft | 60—39.16 X |
| 3,255,586 | 6/1966 | Hennig | 60—39.16 UX |

FOREIGN PATENTS

| | | | |
|---|---|---|---|
| 800,394 | 8/1958 | Great Britain | 60—39.16 |

CLARENCE R. GORDON, Primary Examiner

U.S. Cl. X.R.

60—39.28